No. 672,315. Patented Apr. 16, 1901.
W. A. DOBLE.
IMPACT WATER WHEEL.
(Application filed Apr. 28, 1900.)
(No Model.)
Fig. I
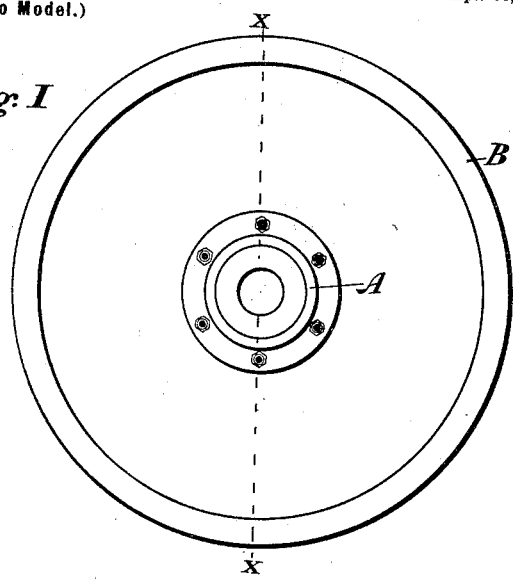
Fig. II
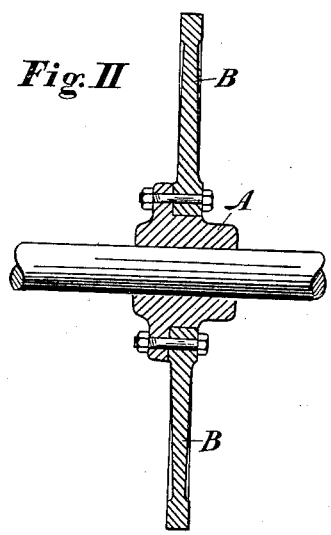
Fig. III
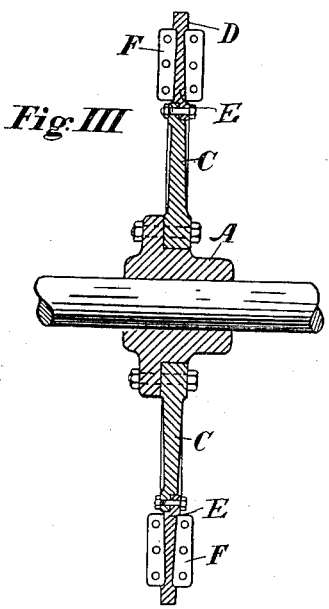
Fig. IV
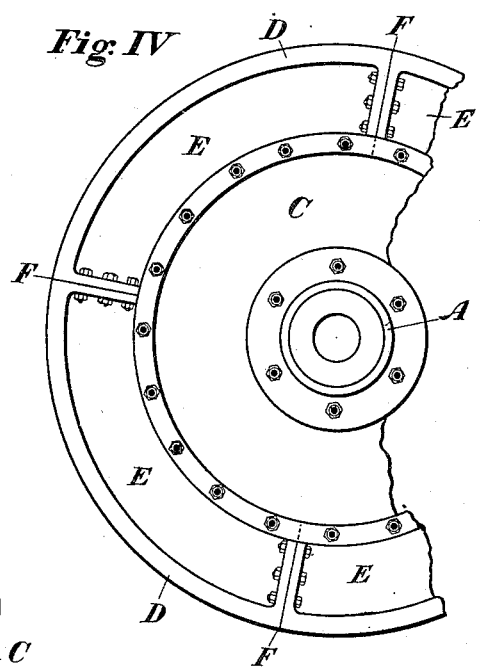
Fig. V
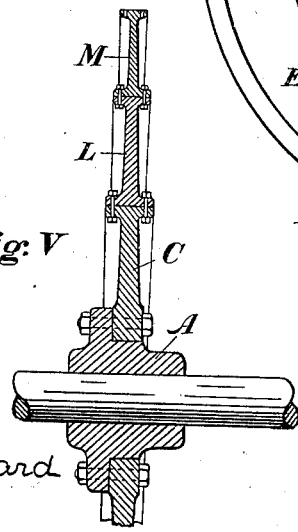
WITNESSES:
P. W. J. Lander
Alfred Borchard
INVENTOR:
William A. Doble,
BY J. Richards & Co.
ATTORNEYS.

UNITED STATES PATENT OFFICE.

WILLIAM A. DOBLE, OF SAN FRANCISCO, CALIFORNIA.

IMPACT WATER-WHEEL.

SPECIFICATION forming part of Letters Patent No. 672,315, dated April 16, 1901.

Application filed April 28, 1900. Serial No. 14,667. (No model.)

*To all whom it may concern:*

Be it known that I, WILLIAM A. DOBLE, a citizen of the United States, residing at San Francisco, county of San Francisco, and State of California, have invented certain new and useful Improvements in Impact Water-Wheels; and I hereby declare the following to be a full, clear, and exact description of the same, reference being had to the accompanying drawings, forming a part of this specification.

This invention relates to the structure of composite wheels, especially tangential water-wheels that are driven at a high peripheral velocity, and are thereby subjected to centrifugal strain beyond what wheels of the common construction will endure.

My improvement consists in plate-wheels of cast material, formed of annular rings that may be solid or composed of one or more segmental parts, and a nave, so disposed as to relieve the several members from inherent or cooling strains, such as are common in other kinds of cast plate-wheels, and especially in wheels cast of steel or other metals that are subjected to great internal strain from cooling.

My improvement also includes the construction of such wheels of different kinds of metal, its strength increasing in proportion to the centrifugal strain to be endured in the different zones.

The main object of my invention is to secure safety from rupture of wheels subjected to great centrifugal strain.

Ordinary disk wheels of cast-iron have dangerous inherent strains set up by unequal contraction in cooling during the process of casting, and such strains are not discoverable except by inference. If such wheels are so constructed and the material is disposed in a manner to avoid inherent strains, the peripheral velocity can be in proportion to the tensile strength of the various metals and alloys of which the wheels are made and equal to the highest requirements that occur in practice. To these ends I construct wheels as illustrated in the drawings herewith forming a part of this specification.

Figure I is a side elevation of a wheel constructed according to my improvement composed of two elements or parts; Fig. II, a section through Fig. I on the line $x$ $x$; Fig. III, a section through a larger wheel composed of three zones or two segmental parts and a nave. Fig. IV is a broken side view of the wheel shown in Fig. III. Fig. V is a section through a wheel composed of four elements or parts.

Referring now to the drawings, and first to the Figs. I and II thereof, these represent a wheel composed of a nave or central portion A and a rim B. The nave A, not being subjected to great centrifugal strains, is commonly made of cast-iron and free from cooling strains, such as are set up when the nave is cast integrally with the rim. The rim B, having a nearly uniform cross-section, can contract in all directions, and consequently is free from these cooling strains that would weaken it when cast in one piece with the nave. The rim when subjected to high centrifugal strain can be cast of metal of greater tensile strength than the nave is made of—of steel, for example. The construction is fully disclosed in the drawings, the two members A and B being secured together by bolts in the usual manner.

Referring to Figs. III and IV, the member A is the same as in Figs. I and II, also the annular member C the same as B, except as to section. The third or outer zone D is in this case shown in segments consisting of sections E, bolted together at F. This construction is not necessary to secure strength or to avoid strains in the rim or member D so much as to reduce the dimensions of the sections E, that when large are difficult to cast of steel, bronze, or other alloys and to readily permit of transportation from the place of manufacture.

Referring to Fig. V, this shows a built-up construction of four members or zones with the joints between parallel to the axis, a construction suitable for the largest wheels, usually composed as follows: a central nave A of common cast-iron corresponding to Fig. III, the second member C of white or cold blast cast-iron, the third member L of cast-steel, and the fourth member M of bronze or special steel, so the tensile strength and commercial value of the material increases from the center outward in four stages, as before explained.

I am aware that water and other plate wheels subject to high speed and centrifugal strain have been made of fibrous metal plates and do not claim such construction; but What I do claim, and desire to secure by Letters Patent, is—

A composite wheel, consisting of a nave of cast metal, and successive cast-metal rings, one or more, secured to said nave and to each other by bolts or equivalent fastenings, said rings being made of metal of different degrees of tensile strength, progressing outwardly, to provide against the progressively-increasing strain from the nave outward due to centrifugal action, substantially as specified.

In testimony whereof I have signed my name to this specification in the presence of two subscribing witnesses.

WILLIAM A. DOBLE.

Witnesses:
 ALFRED A. ENQUIST,
 ELMER WICKES.